United States Patent
Hirano et al.

(10) Patent No.: US 6,612,910 B1
(45) Date of Patent: Sep. 2, 2003

(54) LIQUID CRYSTAL GLASS SUBSTRATE, METHOD OF CUTTING THE LIQUID CRYSTAL GLASS SUBSTRATE, CUTTER FOR THE LIQUID CRYSTAL GLASS SUBSTRATE AND DISPLAY USING THE LIQUID CRYSTAL GLASS SUBSTRATE

(75) Inventors: Katsuhiko Hirano, Hitachi (JP); Makoto Hayashi, Hitachi (JP); Kunio Enomoto, Tokai-mura (JP); Makoto Kitano, Tsuchiura (JP); Satoshi Kanno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/646,383

(22) PCT Filed: Mar. 11, 1998

(86) PCT No.: PCT/JP98/01016
§ 371 (c)(1),
(2), (4) Date: Sep. 11, 2000

(87) PCT Pub. No.: WO99/46211
PCT Pub. Date: Sep. 16, 1999

(51) Int. Cl.$^7$ ................................................. B24B 1/00
(52) U.S. Cl. ............................ 451/41; 451/54; 451/78; 445/24; 349/193
(58) Field of Search ............................ 451/41, 54, 78, 451/80, 81, 84; 445/24; 349/193

(56) References Cited

U.S. PATENT DOCUMENTS

| | | | | |
|---|---|---|---|---|
| 4,434,582 A | * | 3/1984 | Strauss et al. | 451/239 |
| 5,250,931 A | * | 10/1993 | Misawa et al. | 345/206 |
| 5,591,990 A | * | 1/1997 | Misawa et al. | 257/72 |
| 5,754,158 A | * | 5/1998 | Misawa et al. | 345/100 |
| 5,776,220 A | * | 7/1998 | Allaire et al. | 225/2 |
| 5,832,801 A | * | 11/1998 | Bando | 83/483 |
| 5,962,975 A | * | 10/1999 | Lepselter | 313/586 |
| 6,066,018 A | * | 5/2000 | Grupp et al. | 451/75 |
| 6,258,167 B1 | * | 7/2001 | Kawano et al. | 118/667 |

FOREIGN PATENT DOCUMENTS

| | | | |
|---|---|---|---|
| JP | 50-80586 | * | 6/1975 |
| JP | 7-24736 | * | 1/1995 |
| JP | 8-12361 | * | 1/1996 |

* cited by examiner

Primary Examiner—M. Rachuba
(74) Attorney, Agent, or Firm—Antonelli, Terry, Stout & Kraus, LLP

(57) ABSTRACT

A liquid crystal display device, a liquid crystal display device cutting method, and a liquid crystal display device cutting apparatus that prevents damaging attached flexible conductive lines by providing a rounded water jet cut edge of a glass liquid crystal panel. The liquid crystal display device cutting apparatus includes a pump for increasing the pressure of a liquid, a nozzle with a throat that receives the pressurized liquid, a movable nozzle support that is movable at least in a plane parallel to the liquid crystal display, and a conveyor supporting the liquid crystal display device.

10 Claims, 16 Drawing Sheets

F I G. 11
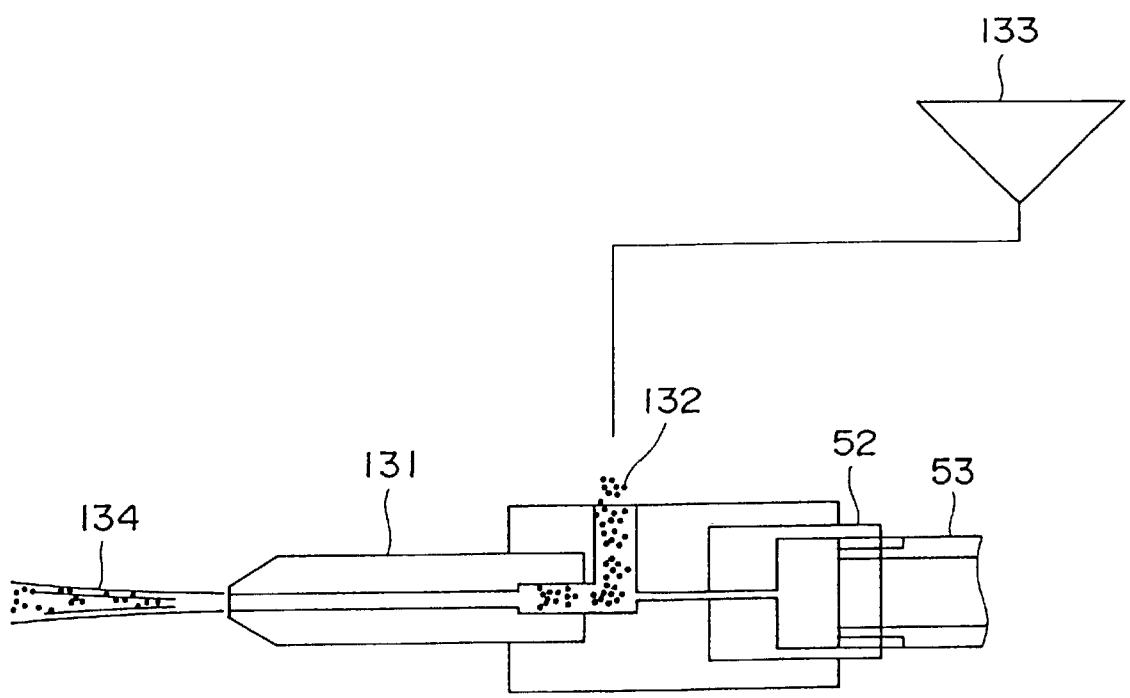

LIQUID CRYSTAL GLASS SUBSTRATE, METHOD OF CUTTING THE LIQUID CRYSTAL GLASS SUBSTRATE, CUTTER FOR THE LIQUID CRYSTAL GLASS SUBSTRATE AND DISPLAY USING THE LIQUID CRYSTAL GLASS SUBSTRATE

BACKGROUND OF THE INVENTION

The present invention relates to a liquid crystal panel, a liquid crystal panel cutting method, a liquid crystal panel cutting apparatus and a liquid crystal display device employing the liquid crystal panel.

According to a first prior art techniques as disclosed in Japanese Patent Laid-open No. Hei 7-100799 cuts a liquid crystal panel is cut for a word processor or the like by pressing a rotary blade having a cutting edge of an acute angle nearly equal to a right angle against the liquid crystal panel, and removes a part of the liquid crystal panel on one side of a groove is removed and a crack formed by pressing the rotary blade against the liquid crystal panel by applying an impulsive force to the part of the liquid crystal panel, applying a thermal shock to the liquid crystal panel by heating the liquid crystal panel by a hot plate or applying impulsive vibrations to the liquid crystal panel by a vibrating device.

When the crack cannot be satisfactorily formed, the first prior art technique needs to apply a high shock to the liquid crystal panel. Particularly, when the substrate is a liquid crystal panel formed by combining a top substrate and a bottom substrate, electrodes disposed between the top and the bottom substrate and a sealing resin, stress is induced around the electrodes and the sealing resin when a shock is applied to the liquid crystal panel. Consequently, defects including separation of the sealing resin from the substrates and undesirable breakage off the cutting line are liable to occur. There is the possibility that methods using heat or impulsive vibrations practice the deterioration of durability and performance.

Cutting a liquid crystal panel for a liquid crystal display device is very difficult as compared with cutting a glass plate because the glass substrate comprises a thin glass plate of a thickness of 1 mm or below, and a film of a material softer than glass formed on the thin glass plate. Flexible conductive lines must be affixed to a part of the glass substrate in the vicinity of a cut edge. When the liquid crystal panel is cut mechanically according to the first prior art technique which forms a crack in the liquid crystal panel, the cut liquid crystal panel has a sharp edge, and there is the possibility that the flexible conductive lines that touch the sharp edge of the liquid crystal panel are cut by the sharp edge.

According to a second prior art technique as disclosed in Japanese Patent Laid-open No. Hei 6-305759 a liquid crystal panel has a cut edge formed by cutting the liquid crystal panel by means of a chamfering tool to exclude the possibility.

However, the second prior art technique needs an additional chamfering process and additional time.

Both the first and the second prior art technique are able to cut a liquid crystal panel only along a straight line in a rectangular shape and are incapable of cutting liquid crystal panels in curvilinear shapes to form liquid crystal panel for use on word processors, calculators, traffic signs, toys and illuminations. Thus, the first and the second prior art techniques are inferior in freedom of design.

SUMMARY OF THE INVENTION

Accordingly, it is a first object of the present invention to provide a liquid crystal panel capable of preventing damaging flexible conductive lenses without requiring time and labor. A second object of the present invention is to provide a liquid crystal panel cutting method capable of preventing damaging flexible conductive lines by a cut edge of the liquid crystal panel without requiring an additional chamfering process. A third object of the present invention is to provide a liquid crystal panel cutting apparatus capable of carrying out the liquid crystal panel cutting method meeting the second object and of cutting the liquid crystal panel in a curvilinear shape. A fourth object of the present invention is to provide a liquid crystal display device employing the liquid crystal substrate meeting the first object.

A first invention to achieve the first object is a liquid crystal panel comprising a glass substrate cut with a water jet. According to the first invention, when cutting a liquid crystal panel with a water jet as shown in FIGS. 16A and 16B, an edge of an end surface of a glass substrate 31 of the liquid crystal panel is broken into particles 201 of a material forming the edge by the impingement of droplets 200 of a water jet 39 jetted through a nozzle 52 thereon. Therefore, the edge of the end surface is rounded without requiring a chamfering progress and hence damaging flexible conductive lines by the edge of the end surface of the glass substrate can be prevented.

A second invention to achieve the second object is a liquid crystal panel cutting method that cuts a liquid crystal panel by repeatedly blasting liquid droplets or abrasive against a component glass substrate of the liquid crystal panel to crush part of the glass substrate by the impact energy of the liquid droplets or the abrasive. According to the second invention, a liquid crystal panel is cut by repeatedly blasting liquid droplets or abrasive against a component glass substrate of the liquid crystal panel to crush part of the glass substrate by the impact energy of the liquid droplets or the abrasive. The edge of an end surface of the glass substrate is rounded by the impact applied thereto by the liquid droplets or the abrasive. Therefore, flexible conductive lines will not be damaged even if the same come into contact with the edge of the end surface of the glass substrate.

A third invention to achieve the fourth object is a display provided with a liquid crystal panel as a display means, in which the liquid crystal panel has a glass substrate cut with a water jet. According to the third invention, the liquid crystal panel of the display hardly capable of damaging the flexible conductive lines improves the reliability of the display.

A fourth invention to achieve the third object is a liquid crystal panel cutting apparatus comprising a pressure increasing means for increasing the pressure of a liquid, a nozzle provided with a throat that receives the liquid of a pressure produced by the pressure increasing means; a nozzle moving means supporting the nozzle so as to be movable at least in a plane parallel to the liquid crystal panel, and a table supporting the liquid crystal panel. According to the fourth invention, the pressure of the liquid is raised by the pressure increasing means, the liquid is supplied to the nozzle, the flow of the liquid is restricted by the throat and the velocity of the liquid is increased to produce a jet, the jet is applied to the glass substrate of the liquid crystal panel supported on the table, the material of the glass substrate is crushed into particles and removed by the impact energy of the jet of the liquid to cut the glass substrate, and the edge of the cut end surface is rounded by the impact of the liquid thereon to prevent damaging flexible conductive lines when the same touches the edge of the edge surface of the glass substrate. The nozzle is moved in the plane parallel to the liquid crystal panel by the nozzle moving means to cut the liquid crystal panel along a cutting line including curves to form the liquid crystal panel in a desired shape. Thus, the liquid crystal can be formed in a shape of a desired design.

According to a fifth invention, in the liquid crystal panel cutting apparatus according to the fourth invention, the nozzle is provided with an abrasive feed port, and an abrasive fed device for feeding the abrasive is connected to the abrasive feed port to feed the abrasive to the nozzle. The fifth invention has, in addition to the working effects of the fourth invention, a working effect of blasting the abrasive at a high velocity against the glass substrate to crush and remove the material of the glass substrate. Therefore, the glass substrate can be efficiently cut, and the glass substrate can be cut even if the same has a high strength.

According to a sixth invention, in the liquid crystal panel cutting apparatus according to the fourth invention, a plurality of nozzles similar to the foregoing nozzle are supported by a nozzle moving means. Thus, the sixth invention has, in addition to the working effect of the fourth invention, a working effect of simultaneously cutting a plurality of liquid crystal panels corresponding to the plurality of nozzles. Thus, the liquid crystal panel cutting apparatus is suitable for the mass production of liquid crystal panels.

According to a seven invention, in the liquid crystal panel cutting apparatus according to the fourth invention, the liquid in water, alcohol, aceton or kerosene. Thus the seventh invention has, in addition to the working effect of the fourth invention, a working effect of using a liquid selectively determined according to the property of the liquid crystal panel for cutting the liquid crystal panel to suppress the reduction of the strength of the liquid crystal panel to the utmost.

According to an eighth invention, the liquid crystal panel cutting apparatus according to any one of the fourth to the seventh invention further comprises a liquid tank capable of containing the liquid in a depth great enough to immerse the table, the liquid crystal panel, and the nozzle or the nozzles entirely in the liquid, and the table is disposed in the liquid tank so as to be submerged by the liquid. The eighth invention has, in addition to the working effect of any one of the fourth to the seventh invention, a working effect to cut the liquid crystal panel by the jet jetted by the nozzle immersed in the liquid contained in the liquid tank so as to impinge on the liquid crystal panel, leakage of dust produced by the cutting work and noise generated by the cutting work outside the liquid tank can be suppressed. Significant cavitation occurs in the liquid by the jet jetted from the nozzle and cavitation improves cutting efficiency.

According to a ninth invention, the liquid crystal panel cutting apparatus according to any one of the fourth to the seventh invention further comprises a splash guard surrounding the nozzle so as not to block off the path of the jet of the liquid between the nozzle and the liquid crystal panel. The ninth invention has, in addition to the working effect of any one of the fourth to the seventh invention, a working effect to suppress the scatter of chips and particles produced by cutting work to the utmost by the splash guard.

According to a tenth invention, the liquid crystal panel cutting apparatus according to any one of the fourth to the seventh invention further comprises auxiliary nozzles arranged around the nozzle so as not to block at least a path of the jet of the liquid between the nozzle and the liquid crystal panel, and a liquid source connected to the auxiliary nozzles to supply a liquid of a pressure that will not damage the liquid crystal panel to the auxiliary nozzles. The tenth invention has, in addition to the working effect of any one of the fourth to the seventh invention, a working effect of suppressing the scatter of chips and particles produced by the cutting work by surrounding a region in which the cutting work is carried out by jets jetted from the auxiliary nozzles during the cutting work.

BRIEF DESCRIPTION OF DRAWINGS

FIG. 11 is a schematic sectional view of a nozzle that can be employed in the cutting apparatus according to the present invention and provided with an abrasive feed system.

DESCRIPTION OF THE INVENTION

Figure 1:
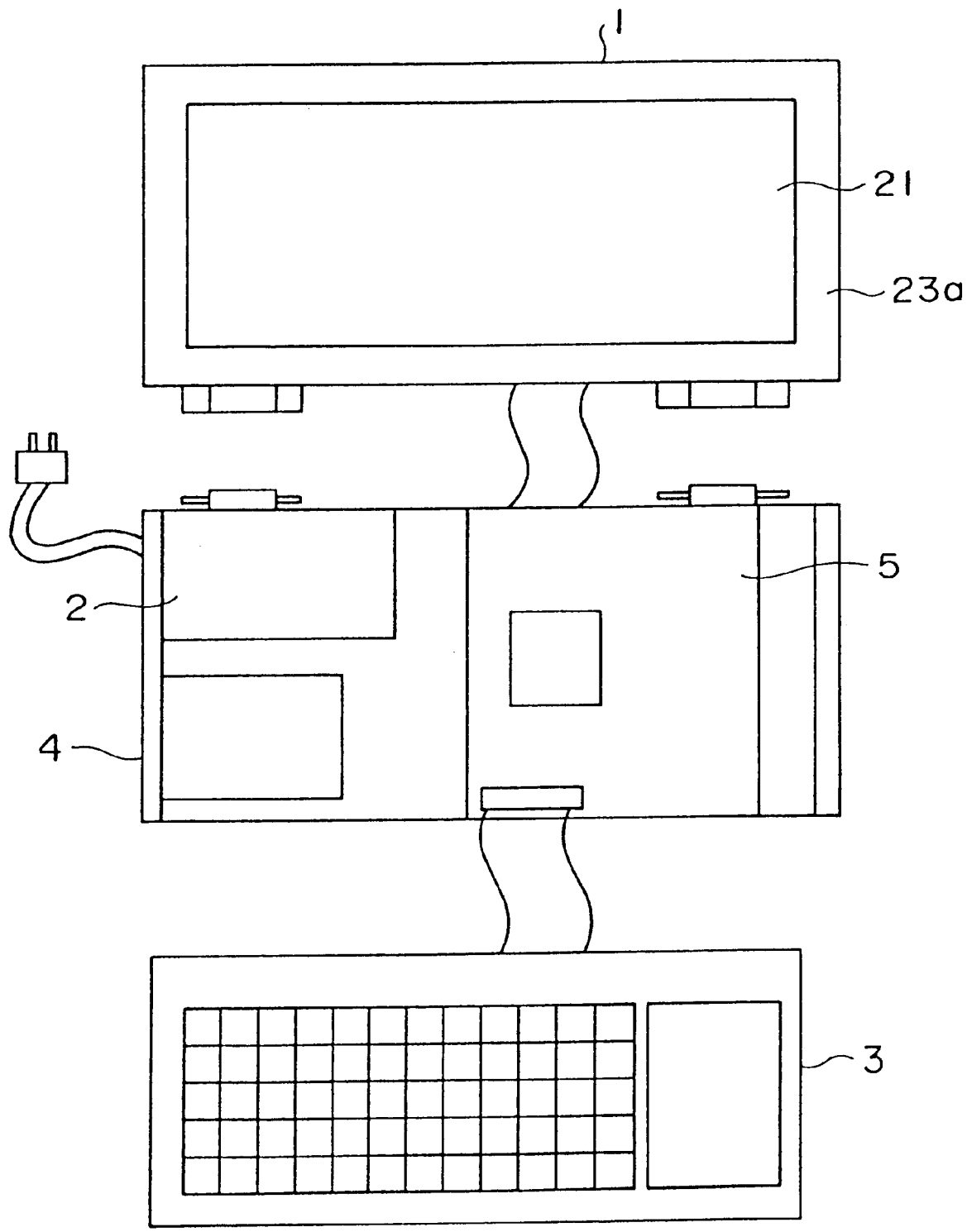
FIG. 1 is a front elevation of a word processor provided with a liquid crystal display device according to the present invention.

FIG. 1 shows a word processor provided with a display device 1 including a liquid crystal panel in a preferred embodiment according to the present invention cut with a water jet. The word processor comprises the display device 1, a power supply 2, an input unit 3, a storage device 4 and an arithmetic unit 5.

Figure 2A:
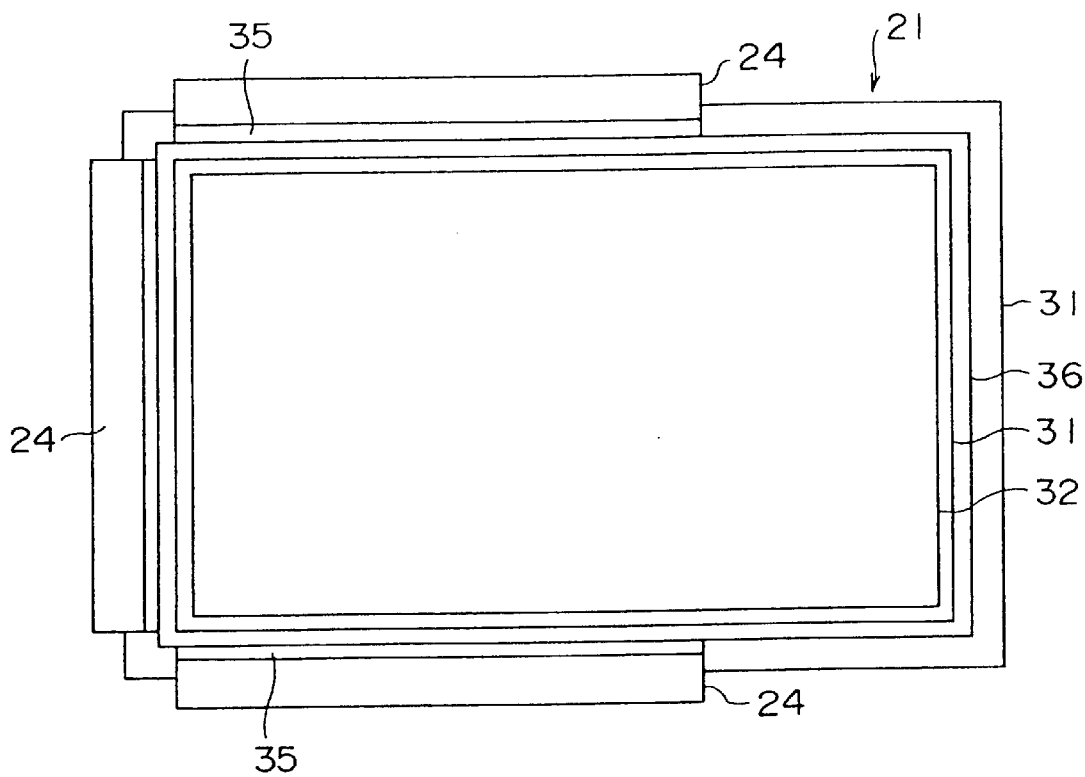
FIGS. 2A and 2B are a front elevation and a side elevation, respectively, of a liquid crystal panel included in the liquid crystal display device shown in FIG. 1.
Figure 2B:
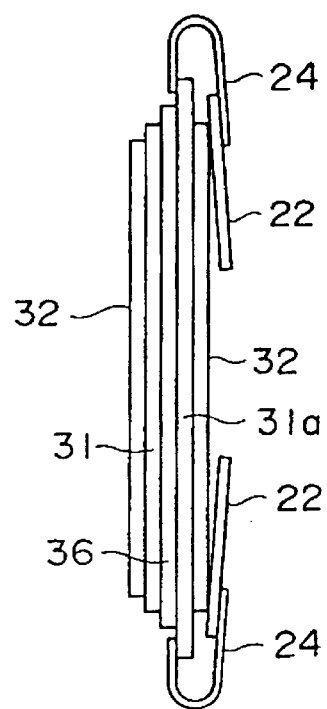

Referring to FIGS. 2A and 2B, a liquid crystal panel 21 included in the display device 1 has a liquid crystal driving circuit 22 connected to driving electrodes 35 formed by edging on a glass substrate 31 by flexible conductive lines 24.

Figure 3:
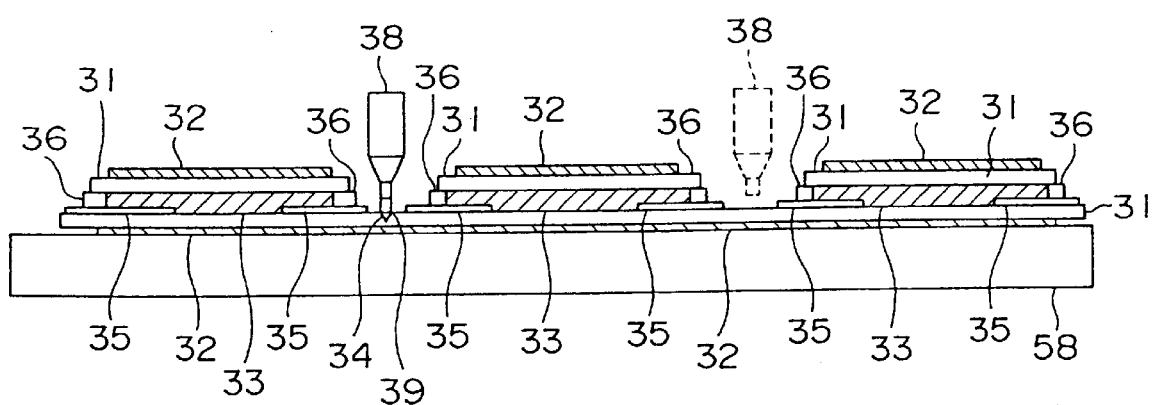
FIG. 3 is a sectional view of liquid crystal panels of assistance in explaining a cutting work according to the present invention.

FIG. 3 is a view of assistance in explaining a cutting operation for cutting the lower glass substrate 31 provided with the driving electrodes 35 with a water jet 39 jetted through a nozzle 52. Upper glass substrates 31 and the lower glass substrate 31 are coated with polarizing films 32. A liquid crystal 33 is sealed in a space defined by each upper glass substrate 31, the lower glass substrate 31 and a sealing resin 36. It is very difficult to cut a workpiece thus formed because the workpiece is formed by assembling members of different materials. However, the workpiece can be effectively cut with the water jet because the water jet is excellent in cutting members of different materials.

Figure 16A:
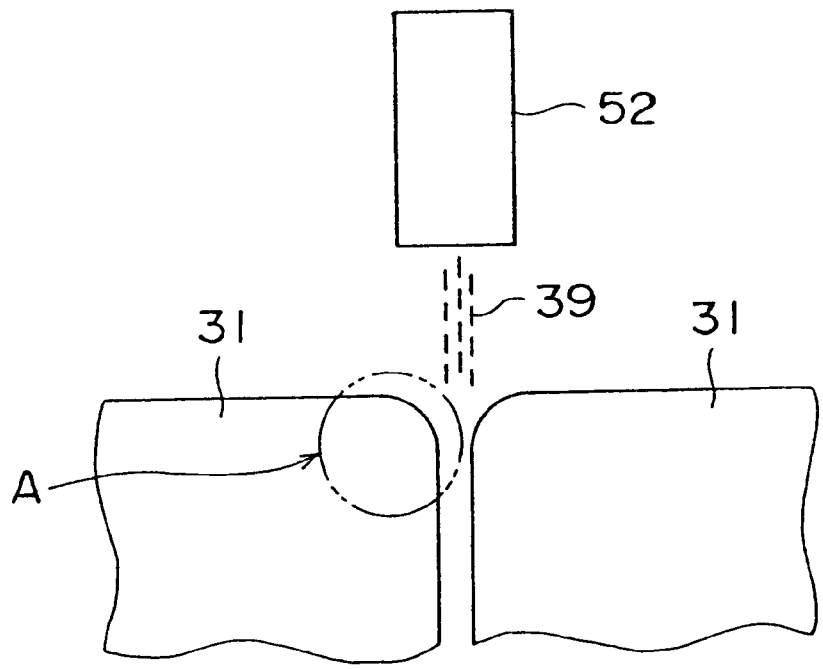
FIG. 16A is a view of assistance in explaining a cut part of a glass plate cut with a water jet.
Figure 16B:
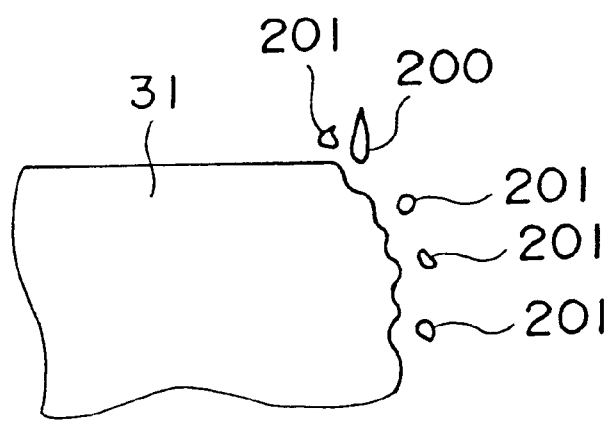
FIG. 16B is an enlarged view of a part A of FIG. 16A.

Corner edges of end surfaces of the liquid crystal panel cut with the water jet 39 is not as sharp as the edges of end surfaces of the same cut with a rotary glass cutter called a router. Thus, the edge of an end surface of the lower glass substrate 31 is rounded as shown in FIGS. 16A and 16B and hence there is no possibility that the flexible conductive lines 24 attached to a peripheral part of the liquid crystal panel 21 as shown in FIGS. 2A and 2B so as to be connected to the driving electrodes 35 are broken when the same come into contact with the edges of the lower glass substrate 31a. Therefore, the flexible conductive lines can be folded along the cut surfaces to form the display device in compact construction and the display device has high reliability.

Figure 4A:
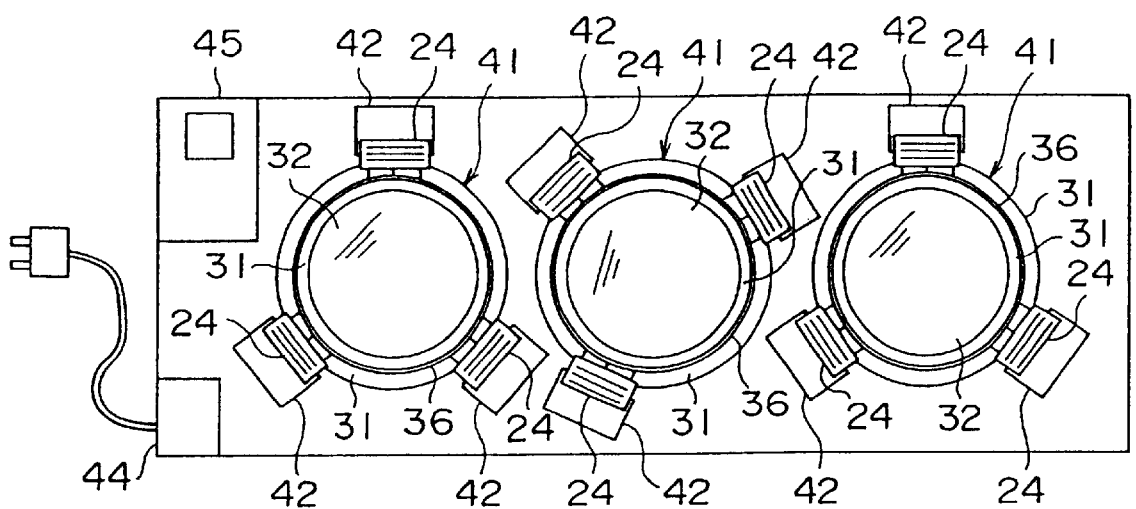
FIG. 4A is a front elevation of an internal arrangement of a traffic signal employing liquid crystal panels according to the present invention.
Figure 4B:
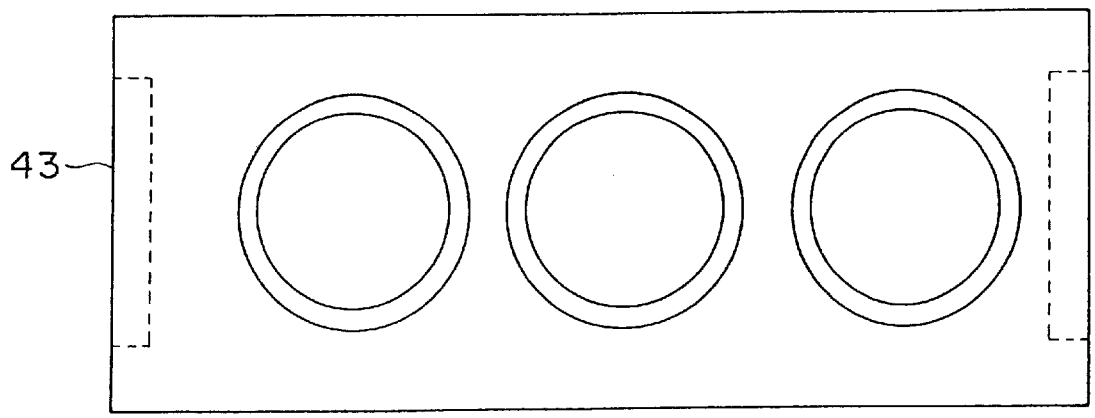
FIG. 4B is a front elevation of a case of the traffic signal shown in FIG. 4A.

FIGS. 4A and 4B show a traffic signal provided with liquid crystal panels of a desired shape embodying the present invention. The traffic signal comprises liquid crystal panels 41, liquid crystal driving circuits 42, a case 43, a power supply unit 44 and an arithmetic unit 45. Whereas the liquid crystal panel 21 is rectangular, the liquid crystal panels 41 are circular.

Since the liquid crystal panels 41 can be formed in a circular shape instead of a rectangular shape, the liquid crystal panels 41 can be arranged in a relatively narrow space and a compact indicating unit can be formed.

Voltage necessary for driving a liquid crystal display, differing from that for driving a LED display, may be low. A traffic signal of the same construction can be manufactured. Indications on a traffic sign employing a liquid crystal panel can be changed simply by changing a program for controlling an internal driving device, and signs can be mass-produced at low costs.

A liquid crystal panel formed in a desired shape by cutting can be applied not only to the foregoing products, but also to toys, illuminations and amusement articles. Since the liquid crystal panel can be cut in an optional shape, the liquid crystal panel can be applied to various articles of different designs.

Figure 5:
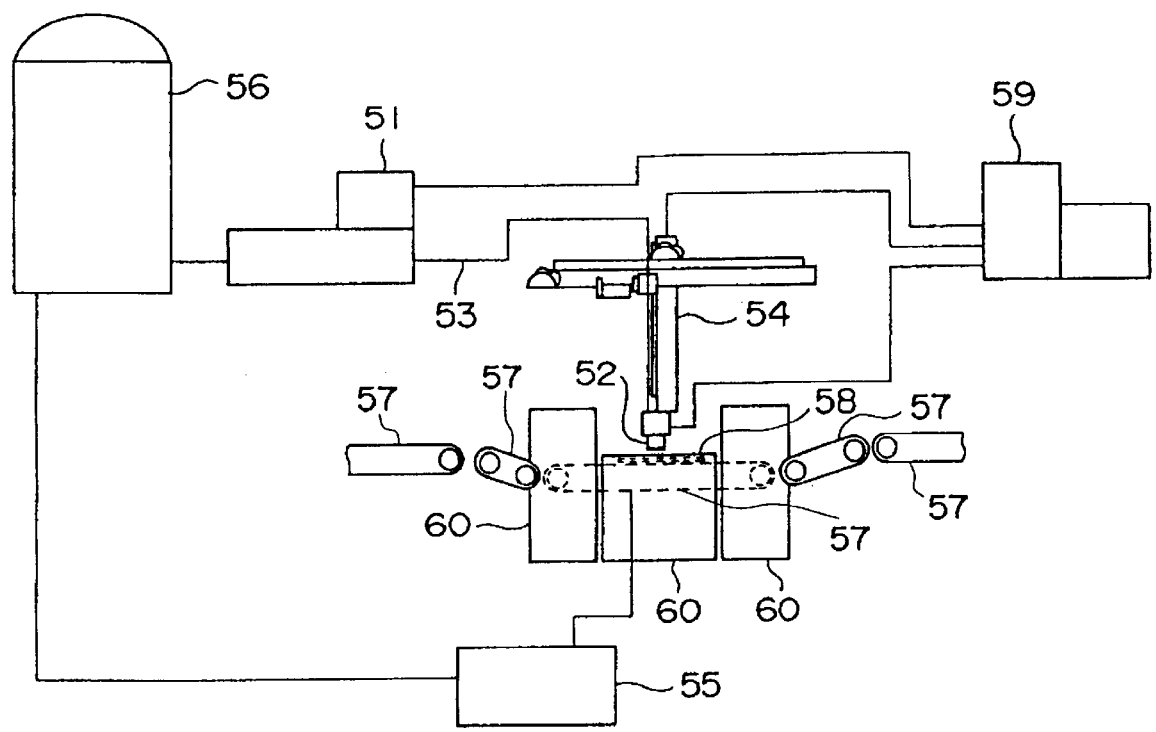
FIG. 5 is a general view of a cutting apparatus according to the present invention.

FIG. 5 shows a liquid crystal panel cutting apparatus that uses a water jet. The liquid cutting panel cutting apparatus comprises the following components.

The liquid crystal panel cutting apparatus comprises a high-pressure pump 51 for pumping water at a high pressure, a nozzle 52 provided with a throat to jet water, a high-pressure hose 53 connecting the high-pressure pump 51 and the nozzle 52, a articulated hand 54 capable of moving the nozzle 52 to a position corresponding to an optional position on a liquid crystal panel (hereinafter, a liquid crystal panel will be referred to as a "workpiece"), a purifying tank 55 for supplying water to the high-pressure pump and purifying recovered water to use the same again, a reservoir tank 56 for storing water returned from the purifying tank 55, a conveyors 57 for conveying the workpiece, a table 58 placed on the conveyor 57 to hold the workpiece fixedly thereon, a controller 59 for controlling those components, and partitions 60 for preventing water splash from scattering.

The components will be described in detail. The high-pressure pump 51 applies an increased pressure to water supplied from the reservoir tank 56 by a pressure intensifier to supply high-pressure water through the high-pressure hose 53 to the nozzle 52. The high-pressure water is jetted through the nozzle 52 in a jet of water against the workpiece supported on the table 58. The workpiece is subjected to a pretreatment at a pretreatment station, is conveyed by the conveyor 57 onto the table 58. The workpiece is fixedly held on the table 58 during a process by a vacuum chuck or a chucking jig. After the completion of the process, the workpiece is released from the table 58 and is carried away by the conveyor 57 in a direction opposite a direction in which the workpiece is conveyed to the table 58. Thus, cutting work can be carried out by a continuous processing system instead of a batch processing system. During the cutting work, the table 58 is surrounded by the partitions 60 to prevent the water jet and particles of the workpiece produced by processing from scattering. The water used for the cutting work is purified in the purifying tank and the purified water is returned to the reservoir tank 56 to use the same again.

Basically, water for the cutting work is pure water. Some glass is affected by water and reduces its strength when exposed to water. When processing a workpiece of such a glass, alcohol, aceton or kerosene is used instead of water. Thus, workpieces of glass that need to be kept away from water can be cut without reducing their strength.

Figure 6:
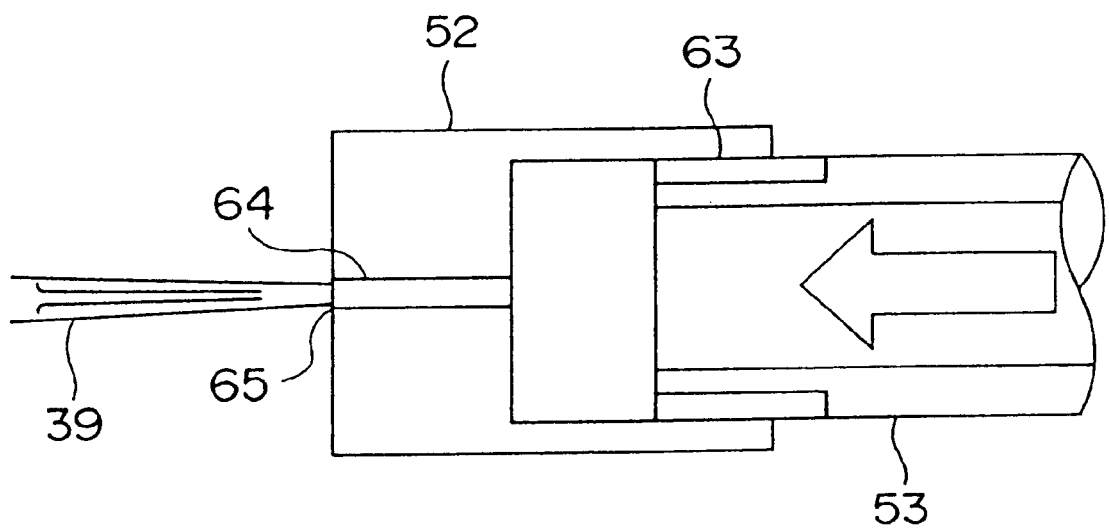
FIG. 6 is an enlarged sectional view of a nozzle included in the cutting apparatus shown in FIG. 5.

FIG. 6 shows a nozzle that jets a water jet. A nozzle 61 has a coupling part 63 to be coupled with a high-pressure hose 62, and a throat 64 defining a passage of a reduced sectional area.

The throat 64 causes a static pressure degradation in high-pressure water 65 and increases the velocity of the fluid. The throat 64 enables a water jet 39 top issue straight therefrom and to reach a distant object. The velocity of the water jet 39 at the outlet 65 of the nozzle is far higher than the velocity of sound and the water jet 39 is capable of cutting an object. Preferably, the discharge pressure of the high-pressure pump 61 is in the range of 50 to 300 MPa, more preferably, in the range of 200 to 300 MPa.

Figure 7A:
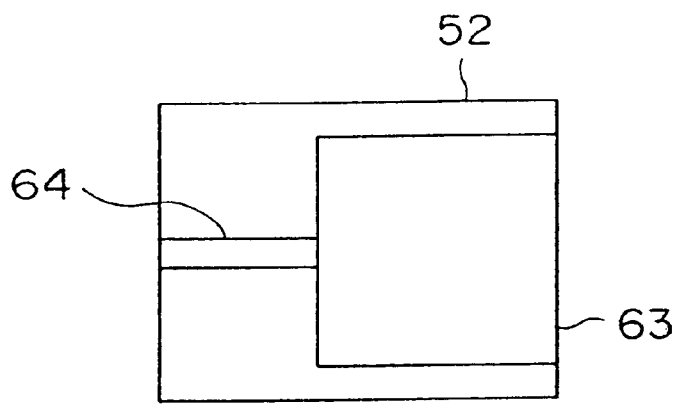
FIGS. 7A, 7B and 7C are sectional views of nozzles applicable to the cutting apparatus shown in FIG. 5.
Figure 7B:
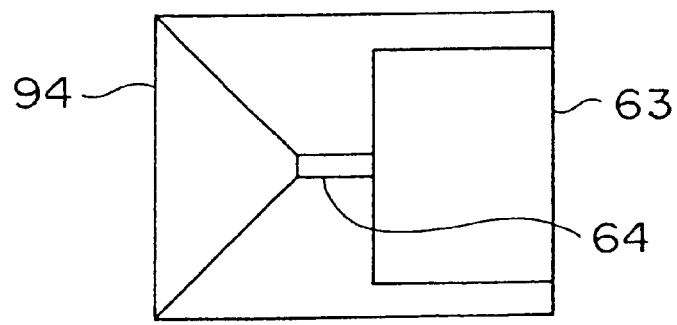
Figure 7C:
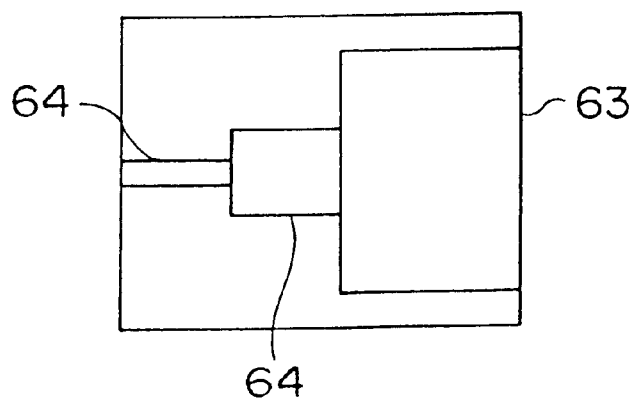

FIGS. 7A, 7B and 7C show nozzles for jetting a liquid jet. All the nozzles shown in FIGS. 7A, 7B and 7C is provided with a throat 64 to jet a liquid jet so as to travel straight at a high velocity to a distant position. The nozzle shown in FIG. 7A is provided with a single-stage throat 64. The nozzle shown in FIG. 7C is provided with a plurality-stage throat 64 and is able to increase the velocity of the liquid jet more effectively than the nozzle provided with a single-stage throat. The liquid jet jetted by the nozzle shown in FIG. 7C shortens the time necessary for cutting. The nozzle shown in FIG. 7B has a coupling part 63, a throat 64 continuous with the coupling part 63, and a flaring part 94 having a taper space expanding from the forward end of the throat 64. The nozzle shown in FIG. 7B is capable of jetting a water jet and of producing cavitation that promotes cutting.

Figure 8:
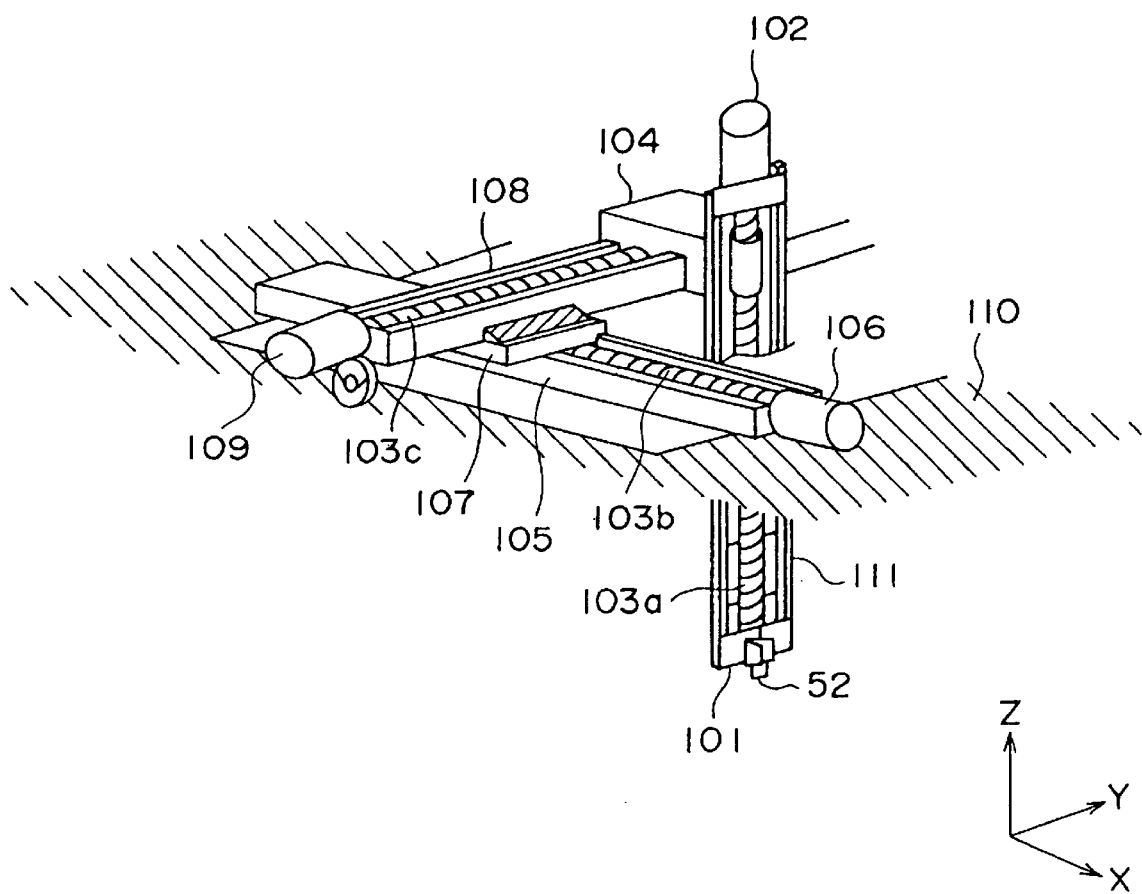
FIG. 8 is an enlarged perspective view of an articulated arm included in the cutting apparatus shown in FIG. 5.

FIG. 8 shows a nozzle moving mechanism capable of optionally moving a nozzle 91 relative to a workpiece, of keeping an appropriate distance between the tip of the nozzle and the workpiece and of moving the nozzle 91 to form the workpiece in a desired shape.

An X-axis bar 105 is fixed to a fixed frame 110 set on the floor of a cutting workshop. A ball screw 103b has a threaded rod supported for rotation on the X-axis bar 106 so as to be driven for rotation by a motor 106, and a slider 107 linked to the threaded rod for movement along the X-axis bar 105.

A Y-axis bar 108 is attached to the slider 107 so as to extend horizontally and perpendicularly to the X-axis bar 105. A ball screw 103c is mounted on the Y-axis bar 108 and is driven by a motor 109.

The ball screw 103c has a slider 104 which is driven for sliding along the Y-axis bar 108 by a threaded rod.

A Z-axis bar 101 is combined with the slider 104 so as to be vertically movable. A ball screw 103a is mounted on the Z-axis bar 101 and is driven for rotation by a motor 102. The ball screw 103a has a slider 104 and a threaded rod linked to the slider 104.

When the threaded rod of the ball screw 103b is driven for rotation by the motor 106, the slider 107 is moved along the X-axis. When the threaded rod of the ball screw 103c is driven for rotation by the motor 109, the slider 104 moves along the Y-axis. Thus, the nozzle 52 attached to a lower end part of the Z-axis bar 101 can be moved in a two-dimensional space, i.e., a plane.

When the threaded rod of the ball screw 103a is driven for rotation by the motor 102, the Z-axis bar 101 combined with the slider 104 moves vertically together with the motor 102 and the ball screw 103a.

Thus, the nozzle 52 can be moved along the Z-axis. Consequently, the nozzle 52 can be moved in a three-dimensional space.

The nozzle 52 is moved along the Z-axis to adjust properly the distance between the liquid crystal panel and the tip of the nozzle 52 during cutting work. The nozzle 52 is moved along the X-axis and the Y-axis to move the nozzle 52 along a curve to cut the liquid crystal panel in a curvilinear shape.

Figure 9:
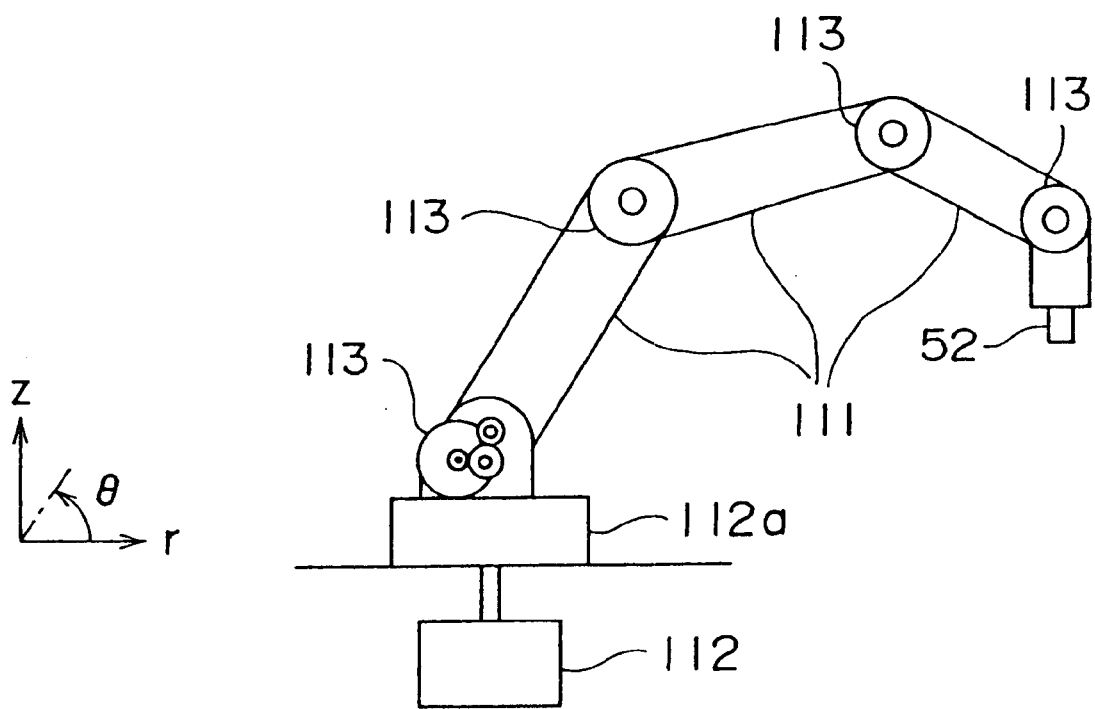
FIG. 9 is a side elevation of another articulated arm that can be employed in the cutting apparatus according to the present invention.

FIG. 9 shows another nozzle moving mechanism for moving a nozzle 52 to an optional position. The nozzle moving mechanism moves the nozzle 52 in a cylindrical coordinate system defined by r, Z and θ. An articulated arm unit having arms 111 is mounted on a swivel base 112a. The swivel base 112a is turned by a driving unit 112 to run the articulated arm unit having the arms 111 in a horizontal plane through an angle θ. The arms 111 of the articulated arm unit can be turned in a vertical plane by driving devices 113 to move the nozzle 52 along the Z-axis and the r-axis. The nozzle 52 is kept in a vertical position. Thus, the nozzle 52 can be moved to an optional position in a three-dimensional space.

Figure 10:
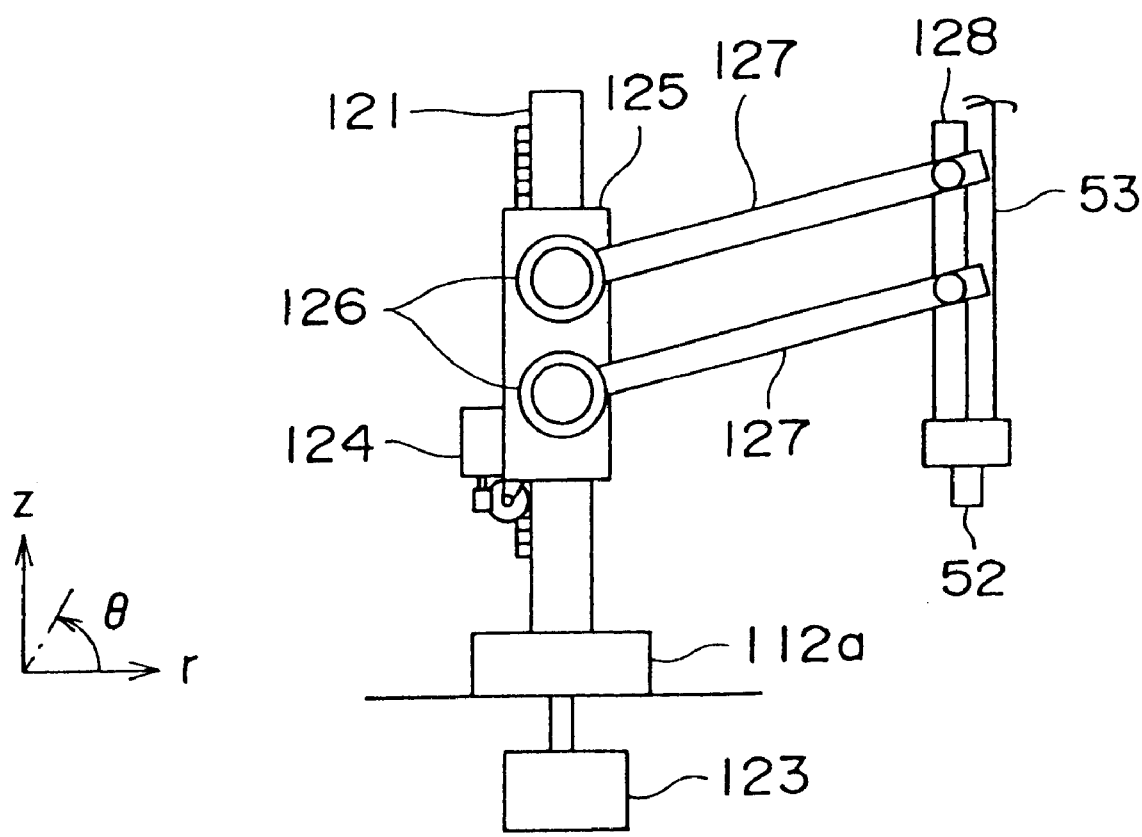
FIG. 10 is a side elevation of a third articulated arm that can be employed in the cutting apparatus according to the present invention.

FIG. 10 shows a third nozzle moving mechanism for moving a nozzle 52 to an optional position. The nozzle moving mechanism moves the nozzle 52 in a cylindrical coordinate system defined by r, Z and θ. A post 121 is set up on a swivel base 112a. The swivel base 112a is turned in a horizontal plane by a driving mechanism 123 to turn components including the nozzle 52 and supported on the swivel base 112a through an optional angle θ. A slider 125 is combined with the post 121 and is moved vertically along the post 121 by a rack-and-pinion driving mechanism 124 to move the nozzle 52 along the Z-axis to an optional position.

A parallel crank mechanism includes links 127, a nozzle holding member 128 and a slider 125. The links 127 are supported on the slider 125 so as to be turned in a vertical plane by driving mechanisms 126. The nozzle 52 connected to the lower end of the nozzle holding member 128 can be moved in directions parallel to the r-axis to an optional position by turning the links 127 in a vertical plane. The nozzle 52 held in a vertical position can be moved to an optional position in a three-dimensional space.

The nozzle may be held by any nozzle moving mechanism other than those mentioned above; the nozzle may be held by any suitable nozzle moving mechanism including a nozzle holding member, an articulated armor a linkage combined with the nozzle holding member, and driving mechanisms for driving those components.

The nozzle can be held at an appropriate distance from the workpiece at all times by the foregoing mechanism. Preferably, tip-to-work distance, i.e., the distance between the tip of the nozzles and the workpiece, is in the range of 1 to 5 mm, more preferably, in the range of 1 to 2 mm. The nozzle can be positioned at an appropriate distance from the workpiece by moving the same in directions along the Z-axis by any one of the nozzle moving mechanisms shown in FIGS. 8, 9 and 10.

The workpiece can be cut in an optional curvilinear shape, such as a circular shape or a heart shape by moving the nozzle 52 in a three-dimensional space or at least in a horizontal plane. Thus, the present invention is applicable to cutting liquid crystal panels for toys, traffic signals, traffic signs, advertising lamps and the like.

FIG. 11 shows an embodiment provided with a nozzle 52 that issues a water jet, an abrasive supply system, and a nozzle 131 connected to a forward end part of the nozzle 52 and capable of issuing high-pressure water containing an abrasive. A jet issued from the nozzle 52 flows into the nozzle 131, and an abrasive 132 is supplied from a hopper 133 to a position between the nozzles 52 and 131. The abrasive is mixed in the water jet 39 by a negative pressure produced by the jet. The water jet 39 containing the abrasive is jetted through the nozzle 131 against a workpiece. The abrasive is supplied at a supply rate in the range of 50 to 150 gf/min, more preferably, at a supply rate of 150 gf/min.

Figure 12A:
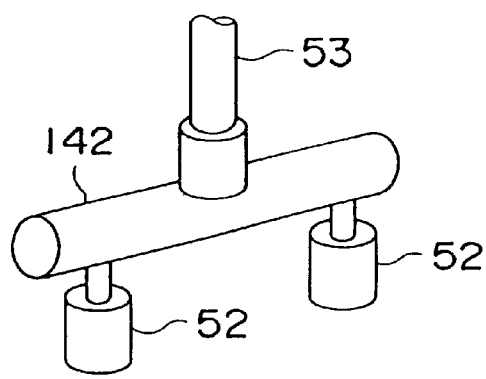
FIG. 12A is a perspective view of a nozzle unit having two nozzles and a high-pressure hose for a cutting apparatus according to the present invention.
Figure 12B:
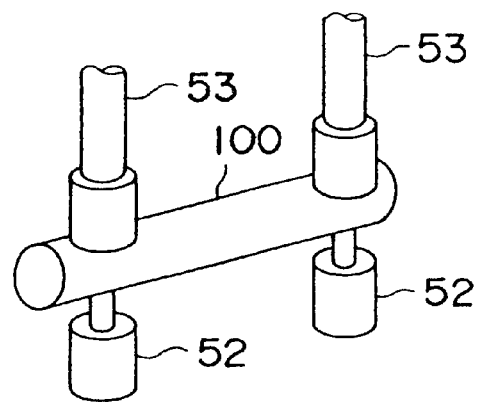
FIG. 12B is a perspective view of nozzle unit having two nozzles and two high-pressure hoses for a cutting apparatus according to the present invention.

FIGS. 12A, 12B and 13C shows cutting apparatus embodying the present invention each provided with a plurality of nozzles that issue a water jet. The cutting apparatus shown in FIG. 12A has a pipe 142 connected to a high-pressure hose 53 and having closed opposite ends, and two nozzles 52 attached to the pipe 142. A liquid supplied through the high-pressure hose 53 into the pipe 142 is issued through the two nozzles 52 in water jets to cut two parts of a workpiece simultaneously. The cutting apparatus shown in FIGS. 12A, 12B and 12C is the same in other respects as that shown in FIG. 5.

In a cutting apparatus shown in FIG. 12B, two high-pressure hoses 53 are connected to a high-pressure pump 51, two nozzles 52 are connected to the high-pressure hoses 53, respectively, and the two nozzles 52 are connected by a member 100 having a rigidity high enough to keep the nozzles 52 spaced a predetermined distance apart. A liquid supplied through the high-pressure hoses 53 is issued through the two nozzles 52 in water jets to cut two parts of a workpiece simultaneously. The cutting apparatus shown in FIGS. 12A, 12B and 12C is the same in other respects as that shown in FIG. 5.

Figure 12C:
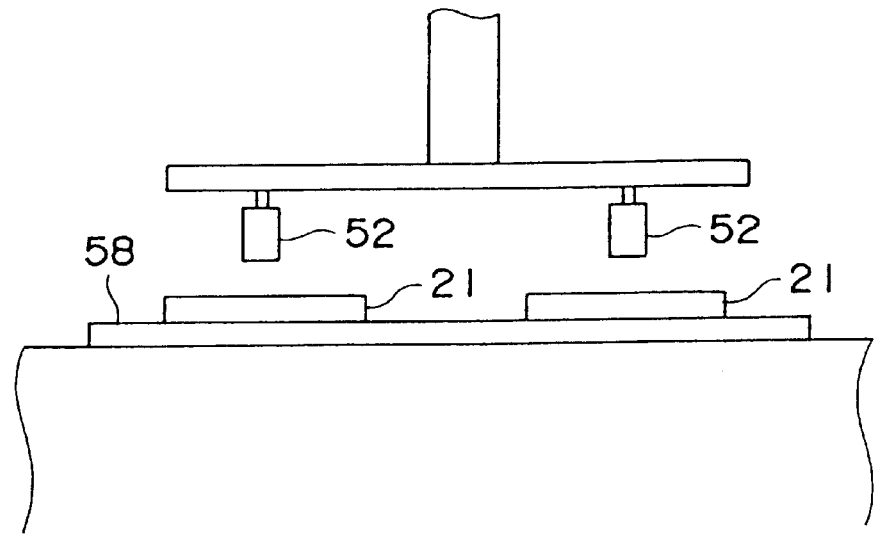
FIG. 12C is a side elevation of assistance in explaining the relation between two nozzles and liquid crystal panels.

FIG. 12C shows the positional relation between a plurality of nozzles 52 and a workpiece. The pipe 142 or the member 100 is held by the articulated arm 54 shown in FIG. 5 so as to be movable in a three-dimensional space, the plurality of nozzles 52 are located above liquid crystal panels 21 fixedly mounted on a table 58, water jets are issued simultaneously through the plurality of nozzles 52 to cut the plurality of liquid crystal panels 21 simultaneously. Consequently, processing time can be reduced.

Figure 13:
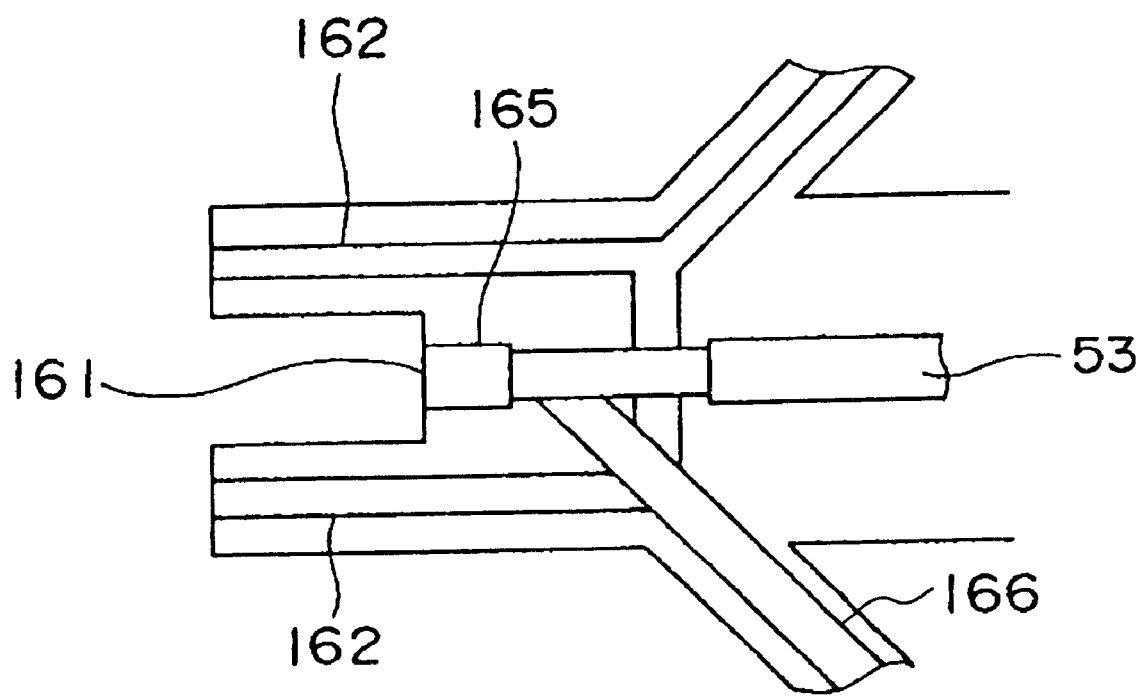
FIG. 13 is a sectional view of a nozzle provided with auxiliary nozzles for a cutting apparatus according to the present invention.

FIG. 13 is a sectional view of a composite jetting apparatus that prevents the scatter of particles produced when a workpiece is cut and an abrasive mixed in high-pressure water. The composite jetting apparatus issues auxiliary jets of a velocity lower than that of a main jet so as to surround the main jet.

Auxiliary nozzles 162 are arranged so as to surround a main nozzle 151. A high-pressure hose 53 is connected to the main nozzle 161. An abrasive supply pipe 166 is connected to a mixer 165 connected to the main nozzle 161. An abrasive is mixed in high-pressure water by the mixer 165 and high-pressure water containing the abrasive is jetted through the main nozzle 161. Low-pressure water jets issued from the auxiliary nozzles 161 prevents the scatter of water containing the abrasive.

Figure 14:
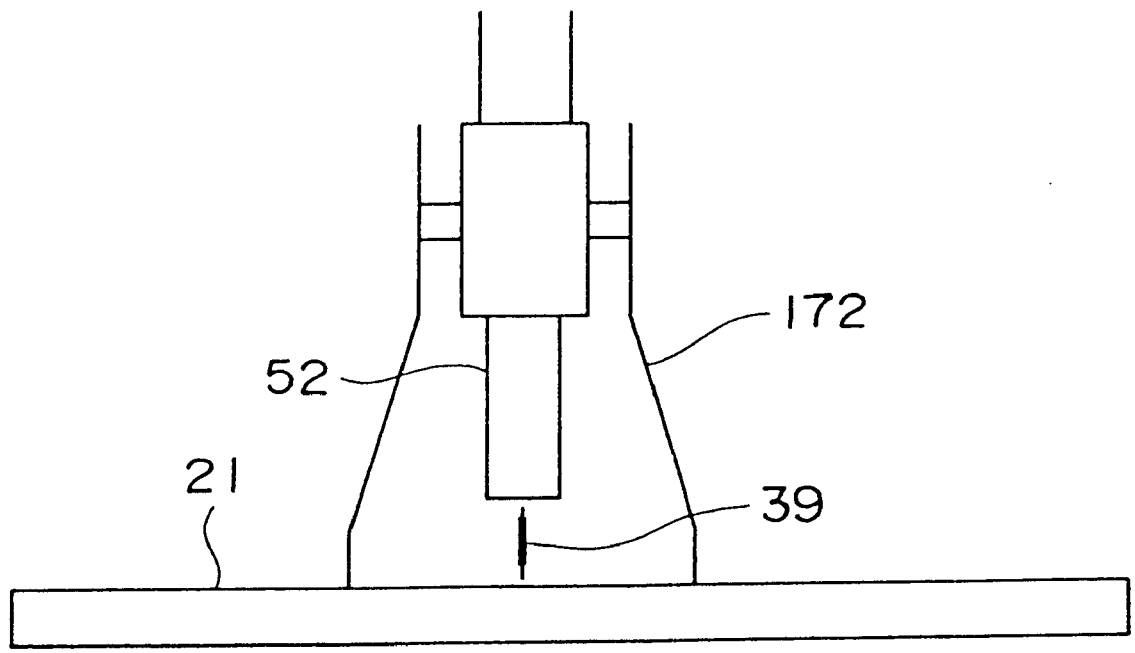
FIG. 14 is a sectional view of a nozzle provided with a splash guard for a cutting apparatus according to the present invention.

FIG. 14 is a sectional view showing a cover covering a part of a workpiece being processed to prevent the scatter of particles produced when the workpiece is cut and an abrasive mixed in high-pressure water.

A nozzle 52 jetting a water jet 39 against a liquid crystal panel 21 is surrounded by a cover 172.

The scatter of particles produced when the liquid crystal panel 21 is processed or an abrasive contained in the water jet is prevented by the cover 172.

Figure 15:
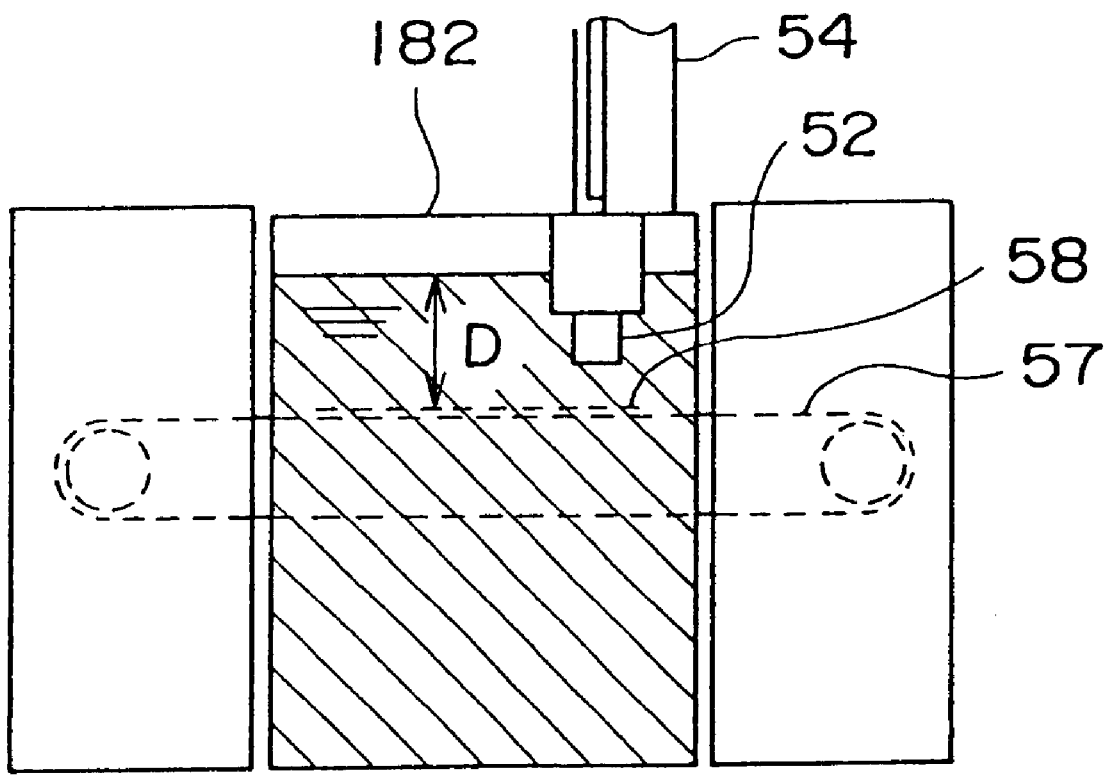
FIG. 15 is a front elevation of components of a cutting apparatus according to the present invention that carries out cutting work in a liquid.

FIG. 15 shows the table 58 and a part of the conveyor 57 and the nozzle 52 of the apparatus shown in FIG. 5 immersed in a liquid in a liquid tank 182. A liquid crystal panel is fixed to the table 58 immersed in a depth D of the liquid, a water jet is issued through the nozzle 52 against the liquid crystal panel to cut the liquid crystal panel as mentioned in connection with FIG. 3. The apparatus is the same in other respects as the apparatus shown in FIG. 5. When cutting the liquid crystal panel immersed in water, cavitation is induced by the water jet issued from the nozzle 52, energy generated by the collapse of cavitation contributes to cutting the glass substrate, improves cutting efficiency and hard glass substrates can be easily cut.

What is claimed is:

1. A cutting apparatus for cutting a liquid crystal display having a composite of a first glass substrate, a plurality of second glass substrates arranged over said first glass substrate, a liquid crystal which fills the space between said first and second glass substrates, said liquid crystal being sectioned into a plurality of compartments by a sealing resin, a polarizing film affixed on external surfaces of said first glass substrate and said second glass substrates, and a driving electrode placed in contact with said liquid crystal so as to drive each of said sectioned liquid crystal on said first glass substrate, said cutting apparatus comprising:

means for boosting pressure of water;

a nozzle, having a throat therein for jetting out said water of which pressure is boosted;

means for moving said nozzle, said means supporting said nozzle movably in a two-dimensional direction parallel to, and in a vertical direction perpendicular to the plane of said liquid crystal display;

a conveyor which continuously moves and which supports said liquid crystal display; and a table placed on said conveyor to hold said liquid crystal display fixedly thereon when said liquid crystal display is cut;

wherein said liquid crystal display is placed on said continuously moving conveyor, said conveyor conveys said liquid crystal display to said table so that jetting out water can give an orderly cut to said polarizing film, said second glass substrates, said sealing resin, said driving electrode, and said first glass substrate, a cut liquid crystal display is released from said table and conveyed away by said conveyor.

2. The cutting apparatus according to claim 1, wherein the nozzle is provided with an abrasive feed port, and an abrasive fed device for feeding abrasive, is connected to the abrasive feed port to feed the abrasive to the nozzle.

3. The cutting apparatus according to claim 1, wherein a plurality of nozzles are supported by a nozzle moving means.

4. The cutting apparatus according to any one of claims 1 to 3 further comprising a liquid tank capable of containing the liquid in a depth sufficient to immerse a table, the liquid crystal display, and the nozzle or the nozzles entirely in the liquid, and the table is disposed in the liquid tank so as to be submerged by the liquid.

5. The cutting apparatus according to any one of claims 1 to 3, further comprising a splash guard surrounding a respective nozzle so as not to block off a path of a jet of the water, between the respective nozzle and the liquid crystal display.

6. The cutting apparatus according to any one of claims 1 to 3 further comprising auxiliary nozzles arranged around a respective nozzles so as not to block at least a path of a jet of the water between the respective nozzle and the liquid crystal display, and a liquid source connected to the auxiliary nozzles to supply a liquid, of a pressure that will not damage the liquid crystal display, to the auxiliary nozzles.

7. A liquid crystal display, comprising:

a first glass substrate;

a second glass substrate arranged over said first glass substrate;

a liquid crystal which fills a space between said first and second glass substrates, said liquid crystal being sectioned into a plurality of compartments by a sealing resin:

a polarizing film affixed on external surfaces of said first glass substrate and said second glass substrate; and a driving electrode placed in contact with said liquid crystal so as to drive each of said divided liquid crystal on said first glass substrate, wherein said liquid crystal display is a single unit of a displaying device, cut out unit-by-unit using a water jet from a composite composed of said polarizing film, said second glass substrate, said sealing resin, said driving electrode, and said first glass substrate, said first glass substrate having a rounded portion at an edge thereof in response to cutting by the water jet, wherein said displaying device has a flexible conductive line electrically connected to said driving electrode adjacent the rounded portion of said first substrate.

8. A liquid crystal display according to claim 7, wherein said flexible conductive line is electrically connected to a driving circuit arranged on a side of said polarizing film affixed on said first glass substrate and to said driving electrode.

9. A method of manufacturing a liquid crystal display having a composite of a first glass substrate, a second glass substrate arranged over said first glass substrate, a liquid crystal which fills a space between said first and second glass substrates, said liquid crystal being divided into a plurality of compartments by a sealing resin, a polarizing film affixed on external surfaces of said first glass substrate and said second glass substrate, and a driving electrode placed in contact with said liquid crystal so as to drive each of said divided liquid crystal on said first glass substrate, said method comprising:

cutting said composite composed of said polarizing film, said second glass substrate, said sealing resin, said driving electrode, and said first glass substrate by a water jet to form a single unit of displaying device so that said first glass substrate has a rounded portion at an edge thereof; and electrically connecting a driving circuit arranged on a side of said polarization film affixed on said first glass substrate to said driving electrode with a flexible conductive line so that the flexible conductive line is adjacent the rounded portion of said first glass substrate.

10. The cutting apparatus according to claim 1 wherein said means supports said nozzle movably so said jetting out water provides a rounded portion at an edge of said first glass substrate.

* * * * *